Patented Mar. 12, 1940

2,193,656

UNITED STATES PATENT OFFICE 2,193,656

ACCELERATOR OF VULCANIZATION

Waldo L. Semon, Silver Lake, Ohio, assignor to The B. F. Goodrich Company, New York, N. Y., a corporation of New York No Drawing. Application September 15, 1937, Serial No. 164,013

16 Claims. (Cl. 260—793)

This invention relates to the art of rubber manufacture and has as its chief object to provide a new and improved class of accelerators of vulcanization.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was being stored prior to vulcanization, making such accelerators practically useless for compounding in rubber on an industrial scale. This uncontrollability combined with their high cost and relative instability resulted in a search for less active, cheaper, more stable materials. Derivatives of mono-aryl and alkyl-aryl dithiocarbamic acids have been proposed as accelerators, but they too are somewhat unstable and, in some cases, even more active than the dialkyl compounds.

In the process of this invention the vulcanization of rubber is accelerated by diaryl dithiocarbamates of the alkali metals. For example, the salts of diphenyl dithiocarbamic acid or the similar ditolyl (ortho, meta, para or mixed), dinaphthyl (alpha, beta or mixed), dixenyl, phenyl-naphthyl, phenyl-xenyl, phenyl-cumyl, phenyl-p-isopropenylphenyl, p-allylphenyl-beta-naphthyl, phenyl-p-isopropoxyphenyl, phenyl-p-phenyloxyphenyl, phenyl-p-hydroxyphenyl, di-o-anisyl, phenyl-p-chlorphenyl, phenyl-m-bromphenyl, phenyl-p-dimethylaminophenyl, phenyl-p-methylaminophenyl, phenyl-p-anilinophenyl, phenyl-p-nitrophenyl, phenyl-p-acetyl-amidophenyl, or other like diaryl dithiocarbamic acids with an alkali metal, i. e., lithium, sodium, potassium, rubidium, or caesium are all excellent accelerators of vulcanization. The term aryl is therefore to be understood as designating both unsubstituted and substituted monovalent radicals containing an aromatic carbocyclic ring with the free valence on a nuclear carbon atom unless it is specifically limited to hydrocarbon aryl groups. The diarylene bis dithiocarbamic acids such as diphenylphenylene bis dithiocarbamic acid are also included in the generic term diaryl dithiocarbamic acid. Although these salts in which alkali metals are combined solely with diaryl dithiocarbamic acids produce rapid vulcanization at ordinary vulcanizing temperatures, they are much less apt to cause the "scorching" which is typical of the compounds of the aliphatic substituted acids. The alkali metal salts of diaryl dithiocarbamic acids are also far more stable, and can be kept at room temperatures for considerable periods of time without appreciable change, instead of requiring storage in refrigerators until used, as do many salts of the aliphatic substituted acids. The alkali metal salts are not only cheaper to prepare than other metal salts since they are ordinarily formed as intermediate compounds in the preparation of other metal salts, but they have the distinct advantage that they are soluble in water, alcohol, and other solvents and can therefore be handled in solution when it is desirable. The solubility of the accelerators of this invention combined with the fact that they are basic materials makes them much more useful in the latex industry than are the corresponding insoluble bivalent or trivalent metal salts. Since they possess this wide range of desirable properties, the accelerators of this invention are admirably suited for industrial usage.

The alkali metal salts of diaryl dithiocarbamic acids are readily prepared by replacing the hydrogen of a diarylamine by an alkali metal, reacting with carbon disulfide, and crystallizing out the alkali metal dithiocarbamate. They can be obtained in the anhydrous form, or in some cases, containing water of crystallization. Both forms are useful.

As a specific example of one embodiment of the method of this invention, a rubber composition is prepared by mixing rubber 100 parts by weight, zinc oxide 5 parts, stearic acid 1 part, sulfur 3.5 parts, and sodium diphenyl dithiocarbamate 0.5 part. When the composition is cured in a press for 45 minutes at 260° F., a well-vulcanized product having a tensile strength of over 3000 lbs. per sq. in. is produced. When another composition is prepared using sodium phenyl-beta-naphthyl dithiocarbamate as the accelerator, a tensile strength of over 4000 lbs. per sq. in. is developed by heating in a press for 30 minutes at 260° F. Even better results are obtained by adding a nitrogenous base to activate the accelerator. For example, when 0.3 part of sodium diphenyl dithiocarbamate are used as an accelerator in the above composition along with 0.2 part of polybutylidene-aniline as an activator, a stronger and stiffer composition is obtained by vulcanization under the same conditions.

It is to be understood that the specific examples given above are merely illustrative of one manner of use of the accelerators of this invention; that other accelerators within the scope of the class herein defined may be substituted for the specific compounds used in the examples; that the accelerators of this invention may be used to vulcanize rubber broadly, including caoutchouc, balata, gutta-percha, synthetic rubber, or natural or artificially prepared latex; that the accelerators may be incorporated in the rubber by mastication or milling, or in the case of latex or other dispersion or solution, by simply dissolving therein; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of an alkali metal salt of a diaryl dithiocarbamic acid.
2. The process which comprises vulcanizing rubber in the presence of the sodium salt of a diaryl dithiocarbamic acid.
3. The process which comprises vulcanizing rubber in the presence of sodium salt of a di-(hydrocarbon-aryl) dithiocarbamic acid.
4. The process which comprises vulcanizing rubber in the presence of sodium diphenyl dithiocarbamate.
5. The process which comprises vulcanizing rubber in the presence of an alkali metal salt of a phenylaryl dithiocarbamic acid.
6. The process which comprises vulcanizing rubber in the presence of an alkali metal salt of a phenylnaphthyl dithiocarbamic acid.
7. The process which comprises vulcanizing rubber in the presence of sodium phenyl-alpha-naphthyl dithiocarbamate.
8. The process which comprises vulcanizing rubber in the presence of sodium phenyl-beta-naphthyl dithiocarbamate.
9. The process which comprises heating a mixture of rubber, sulfur, and an alkali metal salt of a diaryl dithiocarbamic acid.
10. The process which comprises heating a mixture of rubber, sulfur, a nitrogenous base, and an alkali meal salt of a diaryl dithiocarbamic acid.
11. A rubber composition which has been vulcanized in the presence of an alkali metal salt of a diaryl dithiocarbamic acid.
12. A rubber composition which has been vulcanized in the presence of the sodium salt of a diaryl dithiocarbamic acid.
13. A rubber composition which has been vulcanized in the presence of a sodium salt of a di-(hydrocarbon-aryl) dithiocarbamic acid.
14. A rubber composition which has been vulcanized in the presence of sodium diphenyl dithiocarbamate.
15. A rubber composition which has been vulcanized in the presence of sodium phenyl-alpha-naphthyl dithiocarbamate.
16. A rubber composition which has been vulcanized in the presence of sodium phenyl-beta-naphthyl dithiocarbamate.

WALDO L. SEMON.